(12) United States Patent
Zhang

(10) Patent No.: US 12,456,298 B2
(45) Date of Patent: Oct. 28, 2025

(54) METHOD FOR DETERMINING VIDEO CODING TEST SEQUENCE, ELECTRONIC DEVICE AND COMPUTER STORAGE MEDIUM

(71) Applicant: Beijing Baidu Netcom Science Technology Co., Ltd., Beijing (CN)

(72) Inventor: Jiaojiao Zhang, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 607 days.

(21) Appl. No.: 17/902,521

(22) Filed: Sep. 2, 2022

(65) Prior Publication Data

US 2022/0415046 A1   Dec. 29, 2022

(30) Foreign Application Priority Data

Nov. 9, 2021   (CN) .......................... 202111319210.3

(51) Int. Cl.
*G06V 20/40*   (2022.01)
*H04N 19/90*   (2014.01)

(52) U.S. Cl.
CPC ............. *G06V 20/41* (2022.01); *H04N 19/90* (2014.11)

(58) Field of Classification Search
CPC ............................... G06V 20/41; G06V 20/46
See application file for complete search history.

(56) References Cited

U.S. PATENT DOCUMENTS

2003/0081124 A1   5/2003   Balasubrawmanian et al.
2013/0188060 A1   7/2013   Steinberg et al.

FOREIGN PATENT DOCUMENTS

| CN | 112188310 A | * | 1/2021 | ......... G06K 9/00718 |
|---|---|---|---|---|
| CN | 112399177 A | | 2/2021 | |
| GB | 2485695 A | | 5/2012 | |

OTHER PUBLICATIONS

Pan et al., "A Sport Video Classification Method Based on Hidden Markov Model," *Natural Science Journal of Xiangtan University* 39(1):73-77, Mar. 2017.

* cited by examiner

*Primary Examiner* — Molly Wilburn
(74) *Attorney, Agent, or Firm* — Seed Intellectual Property Law Group LLP

(57) ABSTRACT

An method for determining a video coding test sequence, an electronic device, and a computer readable storage medium are provided. The method includes: determining a candidate video set including multiple candidate videos corresponding to a target service requirement; classifying the candidate videos by content categories to obtain a target distribution of content categories; clustering the candidate videos by values of a preset coding complexity to obtain multiple video classes; selecting from each of the video classes respectively a target class-representative video such that an actual distribution of content categories is consistent with the target distribution of content categories; and constructing a target video coding test sequence based on the target class-representative videos.

18 Claims, 4 Drawing Sheets

METHOD FOR DETERMINING VIDEO CODING TEST SEQUENCE, ELECTRONIC DEVICE AND COMPUTER STORAGE MEDIUM

CROSS-REFERENCE TO RELATED APPLICATIONS

The present application claims the priority of Chinese Patent Application No. 202111319210.3, titled "METHOD FOR DETERMINING VIDEO CODING TEST SEQUENCE, RELATED APPARATUS AND COMPUTER PROGRAM PRODUCT", filed on Nov. 9, 2021, the content of which is incorporated herein by reference in its entirety.

TECHNICAL FIELD

The present disclosure relates to the technical field of image processing, in particular to the field of media cloud technology such as video coding and coder performance testing, and more particularly, to a method for determining a video coding test sequence, an electronic device, a computer readable storage medium.

BACKGROUND

When optimizing a video coder or evaluating performance of a video coder, it is needed to perform testing on a set of general test sequences (similar to a test set used to evaluate various artificial intelligence algorithms).

Current video coding test sequences mainly use general test sequences (i.e., JCTVC video) in the coding standard proposal. Test sequences as used by the H.265 standard are found in the document "JCTVC-L1100". These test sequences cover basic features of videos, such as different resolutions, different frame rates, camera-captured videos, and computer-generated videos.

SUMMARY

Embodiments of the present disclosure provide a method and apparatus for determining a video coding test sequence, an electronic device, a computer readable storage medium, and a computer program product.

In a first aspect, the embodiments of the disclosure provide a method for determining a video coding test sequence, which includes: determining a candidate video set including multiple candidate videos corresponding to a target service requirement; classifying the candidate videos by content categories to obtain a target distribution of content categories; clustering the candidate videos by values of a preset coding complexity to obtain multiple video classes; selecting from each of the video classes respectively a target class-representative video such that an actual distribution of content categories is consistent with the target distribution of content categories; and constructing a target video coding test sequence based on the target class-representative videos.

In a second aspect, the embodiments of the disclosure provide an electronic device including: at least one processor, and a memory communicative connected to the at least one processor, where the memory stores instructions executable by the at least one processor, and the instructions, when executed by the at least one processor, cause the at least one processor to execute the method according to any one implementation in the first aspect.

In a third aspect, the embodiments of the disclosure provide a non-transitory computer-readable storage medium storing computer instructions, where the computer instructions are used to cause a computer to execute the method according to any one implementation in the first aspect.

The method for determining a video coding test sequence provided by embodiments of the present disclosure includes: determining a candidate video set including multiple candidate videos corresponding to a target service requirement; classifying the candidate videos by content categories to obtain a distribution of target content categories; clustering the candidate videos by values of a preset coding complexity to obtain multiple video classes; selecting from each of the video classes respectively a target class-representative video such that an actual distribution of content categories is consistent with the target distribution of content categories; and constructing a target video coding test sequence, based on the target class-representative videos.

It should be understood that the content described in this section is not intended to identify key or important features of the embodiments of the present disclosure, nor is it intended to limit the scope of the present disclosure. Other features of the present disclosure will become readily understood from the following specification.

BRIEF DESCRIPTION OF THE DRAWINGS

After reading detailed descriptions of non-limiting embodiments given with reference to the following accompanying drawings, other features, objectives and advantages of the present disclosure will be more apparent.

DETAILED DESCRIPTION OF EMBODIMENTS

Example embodiments of the present disclosure are described below in combination with the accompanying drawings, and various details of the embodiments of the present disclosure are included in the description to facilitate understanding, and should be considered as exemplary only. Accordingly, it should be recognized by one of ordinary skill in the art that various changes and modifications may be made to the embodiments described herein without departing from the scope and spirit of the present disclosure. Also, for clarity and conciseness, descriptions for well-known functions and structures are omitted in the following description. It should be noted that in case of no conflict, the embodiments and features in the embodiments in the present disclosure may be combined with each other.

In the technical solution of the present disclosure, the collection, storage, use, processing, transmission, provision and disclosure of the user personal information involved are in compliance with relevant laws and regulations, and do not violate public order and good customs.

In the related technology, Due to a need of ensuring comprehensiveness of these general test sequences, the actual performance of coders cannot be accurately determined in some service-specific scenarios.

On the basis of a general coding test sequence, the solution provided by the present disclosure combines, for multiple candidate videos corresponding to the service requirement, the distribution of content categories and a clustering result by using the preset coding complexity. By controlling the actual distribution of content categories of the class representative video selected from each video class obtained by clustering to be consistent with a true distribution of content categories of the candidate videos, the target class-representative video that reflects the service requirement in terms of content category and coding complexity is obtained, and finally the target video coding test sequence added with the additional target video representative videos is obtained. By using the target video coding test sequence, the solution can improve the evaluation pertinence and accuracy on coding performance of a to-be-tested coder for service-specific videos.

Figure 1:
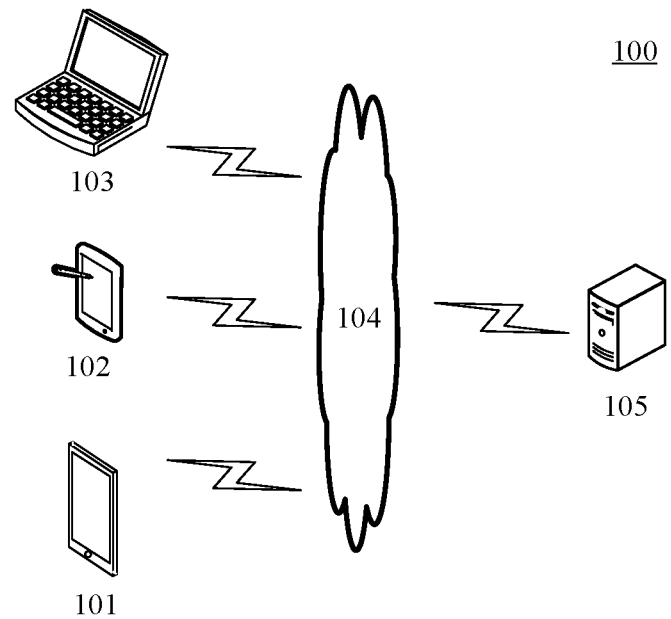
FIG. 1 is an example system architecture in which the present disclosure may be applied.

FIG. 1 illustrates an example system architecture 100 in which embodiments of a method and apparatus for determining a video coding test sequence, an electronic device, and a computer readable storage medium according to the present disclosure may be applied.

As shown in FIG. 1, the system architecture 100 may include terminal devices 101, 102 and 103, a network 104 and a server 105. The network 104 serves as a medium providing a communication link between the terminal devices 101, 102 and 103 and the server 105. The network 104 may include various types of connections, for example, wired or wireless communication links, or optical fiber cables.

A user may use the terminal devices 101, 102 and 103 to interact with the server 105 via the network 104, to receive or send a message, etc. Various applications for implementing information communication between the terminal devices 101, 102, 103 and the server 105 may be installed, such as applications for video coding test sequence construction, applications for video coding performance calculation, instant messaging applications.

The terminal devices 101, 102 and 103 and the server 105 may be hardware or software. When the terminal devices 101, 102, 103 are hardware, they may be various electronic devices having a display screen, including but not limited to smart phones, tablet computers, laptop computers, desktop computers, and so on. When the terminal devices 101, 102, 103 are software, they may be installed in the above electronic devices. They may be implemented as a plurality of software pieces or software modules, or as a single software piece or software module, which is not limited herein. When the server 105 is hardware, it may be implemented as a distributed server cluster composed of a plurality of servers, or as a single server; when the server is software, it may be implemented as a plurality of software pieces or software modules, or as a single software piece or software module, which is not limited herein.

The server 105 may provide various services through various built-in applications. Using a video coding test sequence construction application, which is used for providing video coding test sequence generation service for coding performance test for service-specific videos, as an example. When the server 105 runs the video coding test sequence construction application, the following effects may be achieved: first, collecting multiple candidate videos corresponding to a target service requirement from the terminal devices 101, 102, and 103 through the network 104, and gathering the candidate videos to obtain a candidate video set; then, classifying the candidate videos by content categories to obtain a distribution of target content categories; next, clustering the candidate videos by a preset coding complexity to obtain multiple video classes; in the next step, selecting from each of the video classes respectively a target class-representative video such that an actual distribution of content categories is consistent with the target distribution of content categories; and finally, constructing a target video coding test sequence, based on the target class-representative videos.

Further, the server 105 may also establish a corresponding relationship between the target video coding test sequence obtained by construction and the target service requirement, and provide a coding performance test to a to-be-tested coder for this class of service videos, thus obtaining a targeted coding performance test result.

It should be noted that, in addition to being acquired from the terminal devices 101, 102 and 103 through the network 104, the multiple candidate videos corresponding to the target service requirement may alternatively be pre-stored locally in the server 105 in various methods. Therefore, when the server 105 detects that the data has been stored locally, the data may be acquired directly from the local. In this case, the example system architecture 100 may not include the terminal devices 101, 102, 103 and the network 104.

Since comprehensive coding complexity and content category classification require many computing resources and strong computing power, the method for determining a video coding test sequence provided by subsequent embodiments of the present disclosure is generally performed by the server 105 with strong computing power and more computing resources. Correspondingly, the apparatus for determining a video coding test sequence is generally also arranged in the server 105. However, it should also be noted that when the terminal devices 101, 102, and 103 also have computing power and computing resources that meet the requirements, the terminal devices 101, 102, and 103 may also use the video coding test sequence construction application installed thereon to complete the above operations performed by the server 105, and then output the same results as the server 105. Especially when there are multiple types of terminal devices with different computing powers at the same time, when the video coding test sequence construction application on the terminal devices determines that the terminal devices have strong computing powers and many remaining computing resources, the terminal devices may be used to perform the above operations, thereby appropriately reducing computing pressure of the server 105. Correspondingly, the apparatus for determining a video coding test sequence may also be provided in the terminal devices 101, 102, and 103. In this case, the example system architecture 100 may alternatively not include the server 105 and the network 104.

It should be appreciated that the numbers of terminal devices, networks and servers in FIG. 1 are merely illustrative. Any number of terminal devices, networks and servers may be provided based on implementation needs.

Figure 2:
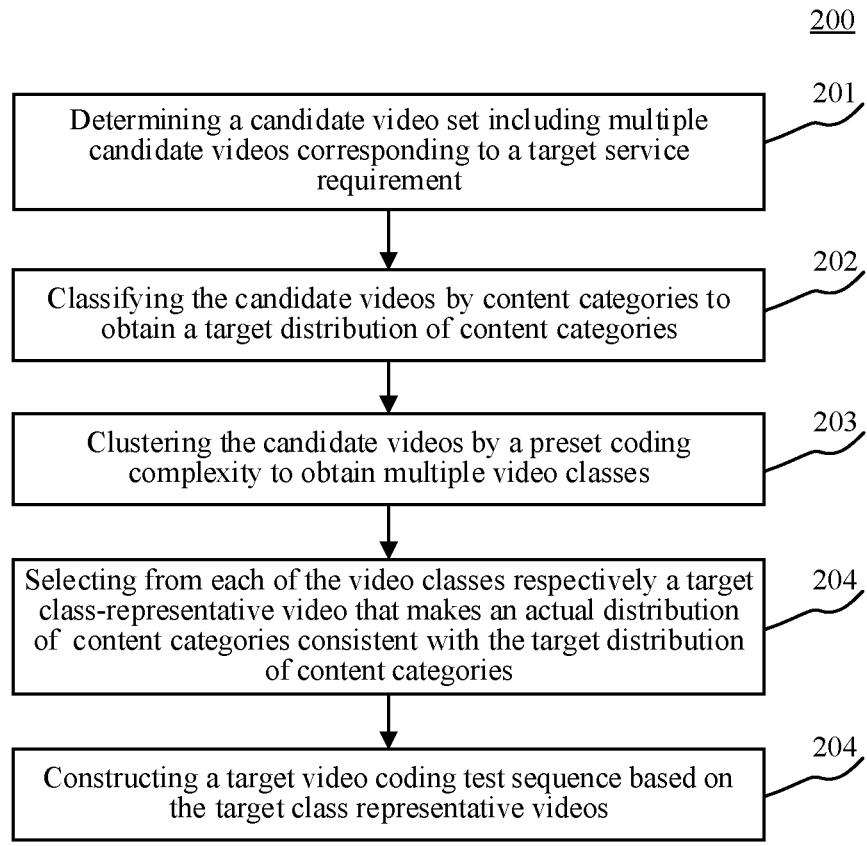
FIG. 2 is a flowchart of a method for determining a video coding test sequence according to an embodiment of the present disclosure.

Referring to FIG. 2, FIG. 2 is a flowchart of a method for determining a video coding test sequence according to an embodiment of the present disclosure, where a flow 200 includes the following steps.

Step 201 includes: determining a candidate video set including multiple candidate videos corresponding to a target service requirement.

The purpose of this step is to determine, by an executing body (for example, the server 105 shown in FIG. 1) of the method for determining a video coding test sequence, the candidate video set including the multiple candidate videos corresponding to the target service requirement.

All types of videos may be divided based on whether they meet the target service requirement into two types, namely, one type of videos that meet the target service requirement, and the other type of videos that do not meet the target service requirement. The purpose of this step is to name the videos that meet the target service requirement as the candidate videos, and to construct a sufficient number of candidate videos as the candidate video set.

In particular, the target service requirement may be defined from multiple aspects of video attributes. For example, videos with a resolution exceeding 2K (i.e., 2560× 1440) may be determined as the videos that meet the target service requirement. In this regard, the target service requirement is to limit the minimum resolution. For example, medium-length videos with a video length exceeding 5 minutes and less than 10 minutes may be determined as the videos that meet the target service requirement. In this regard, the target service requirement is to limit a video duration. In addition to the resolution and the duration shown above, the target service requirement may alternatively be defined based on attributes concerned by actual services, and the corresponding candidate videos may be determined based on the defined target service requirement.

Specifically, the candidate videos may be selected and obtained from own video libraries, or may be obtained by launching a solicitation activity for its own audience, in order to be corresponding to its service requirement as much as possible.

Step 202 includes: classifying the candidate videos by content categories to obtain a distribution of target content categories;

On the basis of step 201, the purpose of this step is to classify, by the executing body, the candidate videos by content categories to obtain the distribution of target content categories. That is, the target distribution of content categories reflects a ratio between actual numbers of the candidate videos of different content categories.

Specifically, classification by video content may be performed in a variety of approaches. For example, extracting at least one key frame from each candidate video, then determining a content category of image content presented by the key frame using image recognition technology. A number of different content categories may be pre-divided according to actual application scenarios, for example, according to the form of video generation, it may be divided into movie, comics (animation), personal documentary, etc. It may also be divided into: static object, fighting, landscape and so on according to picture complexity.

Assuming that all the candidate videos may be divided into 4 categories by content categories in advance, for a total of 10,000 candidate videos, the target distribution of content categories on these 4 categories may be expressed as: 6000:2000:1000:1000, which is simplified as: 6:2:1:1.

Step 203 includes: clustering the candidate videos by values of a preset coding complexity to obtain multiple video classes.

On the basis of step 201, the purpose of this step is to cluster, by the executing body, the candidate videos by values of the preset coding complexity to obtain the multiple video classes obtained by clustering operation. That is, each video class includes multiple candidate videos associated with the preset coding complexity around a cluster center of the class. Since the purpose of clustering is to select a representative video of each video class, the number of cluster centers may also be determined in advance based on the number of service-specific test videos corresponding to the target service requirement in a target video coding test sequence. The number of service-specific test videos may alternatively be determined based on the number of general test videos. For example, a ratio of the number of the service-specific test videos and the number of general test videos is controlled to be 1:1, or a ratio of the number of service-specific test videos to the total number of videos in the sequence is greater than a ratio of the number of general test videos to the total number of videos in the sequence, and an exceeding extent may be flexibly set according to an actual situation. For example, the ratio of the number of service-specific test videos to the number of general test videos is controlled to be 3:2, etc.

Specifically, given the number of cluster centers, clustering may be implemented in a variety of methods in this step, such as K-means clustering algorithm, or other clustering algorithms with the same or similar effects, which is not limited herein.

Step 204 includes: selecting from each of the video classes respectively a target class-representative video such that an actual distribution of content categories consistent with the target distribution of content categories;

On the basis of step 202 and step 203, the purpose of this step is to select by the executing body from each of the video classes a representative video of the class that can represent the video class to which the representative video belongs as accurately as possible, and control the actual distribution of content categories of the selected representative videos of the classes to be consistent with the target distribution of content categories, and a class representative video that meets these requirements is used as the target class-representative video.

It should be noted that the reason to control the actual distribution of content categories to be consistent with the target distribution of content categories is to enable the selected class representative videos to effectively represent all candidate videos with a large quantity. Therefore, by controlling the distribution of content categories of all candidate videos to be the same as the content categories of the class representative videos, the class representative videos can be consistent with all candidate videos in distribution of content categories, rather than having a large deviation.

Specifically, the way of selecting the class representative videos from video classes such that the actual distribution of content categories of the class representative videos is consistent with the target distribution of content categories may be realized in a variety of ways, but it is needed to control that the selected class representative video should be able to sufficiently represent its video class.

Step 205 includes: constructing a target video coding test sequence based on the target class-representative videos.

On the basis of step 204, the purpose of this step is to construct by the executing body the target video coding test sequence based on the target class-representative videos. That is, on the basis of the general test videos, the target class-representative videos are additionally added, thus obtaining the target video coding test sequence including the target class-representative videos and the general test videos. Specifically, how to arrange the videos to obtain the target video coding test sequence may be determined according to all possible constraints in an actual application scenario, which is not limited herein.

On the basis of a general coding test sequence, the method for determining a video coding test sequence provided by embodiments of the present disclosure combines the distribution of content categories and the clustering by the preset coding complexity of multiple candidate videos corresponding to the service requirement. By controlling the actual distribution of content categories of the class representative video selected from each video class obtained by clustering to be consistent with the true distribution of content categories of the candidate videos, the target class-representative video that reflects the service requirement in terms of content category and coding complexity is obtained, and finally the target video coding test sequence added with the additional target class-representative videos is obtained. By using the target video coding test sequence, the method can improve the evaluation pertinence and accuracy on coding performance of a to-be-tested coder for service-specific videos.

Figure 3:
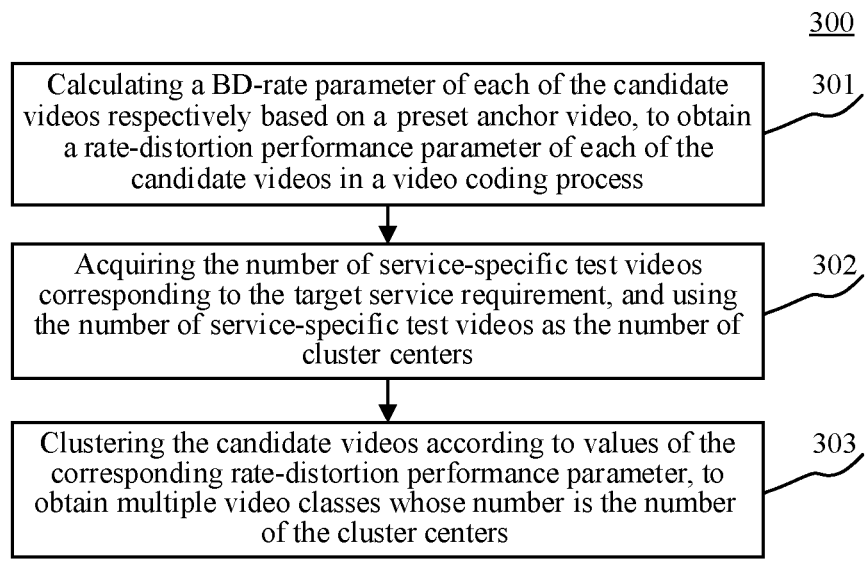
FIG. 3 is a flowchart of a method for clustering by a preset coding complexity in the method for determining a video coding test sequence according to an embodiment of the present disclosure.

Referring to FIG. 3, FIG. 3 is a flowchart of a method for clustering by a preset coding complexity used in the method for determining a video coding test sequence according to an embodiment of the present disclosure. That is, a specific implementation is provided for step 203 in the flow 200 shown in FIG. 2, other steps in the flow 200 are not adjusted, and a new complete embodiment is obtained by replacing step 203 with the specific implementation provided in the present embodiment, where a flow 300 includes the following steps.

Step 301 includes: calculating a BD-rate parameter of each of the candidate videos respectively, based on a preset anchor video, to obtain a rate-distortion performance parameter of each of the candidate videos in a video coding process.

BD-rate: Bjontegaard-Delta-rate, which is one of main parameters for evaluating performance of video coding algorithms, indicates changes in bit rate and PSNR (Peak Signal to Noise Ratio, an evaluation indicator of video quality, the larger the PSNR of a compressed video is, the smaller the distortion caused by the compression is) of videos coded by a new algorithm compared to an original algorithm. Since BD-rate is mainly used to evaluate the rate-distortion performance of video coding, this step refers to BD-rate as the rate-distortion performance parameter.

In video coding, a low bit rate indicates a large amount of compression, and a high PSNR value indicates a good quality. Therefore, for a coding algorithm, if the bit rate is reduced and the PSNR value is increased in a compressed video, the algorithm has good performance. However, generally, video coding algorithms increase the amount of compression at the expense of compression quality, that is, when the bit rate decreases, the PSNR value also decreases. In this case, it is needed to use BD-rate to perform evaluation.

Step 302 includes: acquiring the number of service-specific test videos corresponding to the target service requirement, and using the number of service-specific test videos as the number of cluster centers.

The purpose of this step is to use by the executing body the number of acquired service-specific test videos (that is, the number of service-specific test videos) as the number of designated cluster centers for a subsequent clustering operation.

Since the purpose of clustering is to select the class representative video of each video class, the number of cluster centers may alternatively be determined in advance based on the number of service-specific test videos corresponding to the target service requirement in the target video coding test sequence. The number of service-specific test videos may alternatively be determined based on the number of general test videos. For example, a ratio of the number of the service-specific test video and the general test videos is controlled to be 1:1, or a ratio of the number of service-specific test videos to the total number of the videos in the sequence is greater than a ratio of the number of general test videos to the total number of the videos in sequence, and a exceeding extent may be flexibly set according to an actual situation. For example, the ratio of the number of service-specific test videos to the number of general test videos is controlled to be 3:2, etc.

Step 303 includes: clustering the candidate videos according to corresponding values of the rate-distortion performance parameter, to obtain the multiple video classes whose number is the number of the cluster centers.

On the basis of step 302, the purpose of this step is to cluster by the executing body the candidate videos according to the corresponding values of the rate-distortion performance parameter, to obtain the multiple video classes whose number is the number of the cluster centers.

On the basis of the above embodiment, the present embodiment provides a specific implementation for step 203 in the flow 200 through steps 301 to 303. Specifically, BD-rate is selected as the calculation approach of the preset coding complexity of each candidate video, then, the number of cluster centers of the clustering operation is determined based on the acquired number of service-specific test videos, and finally the multiple video classes are determined by performing the clustering operation.

It should be understood that, in addition to the BD-rate given in the present embodiment, which may be used as the preset coding complexity, other parameters that can represent the complexity of videos in temporal and spatial domains may also be used, which is not limited herein.

Figure 4:
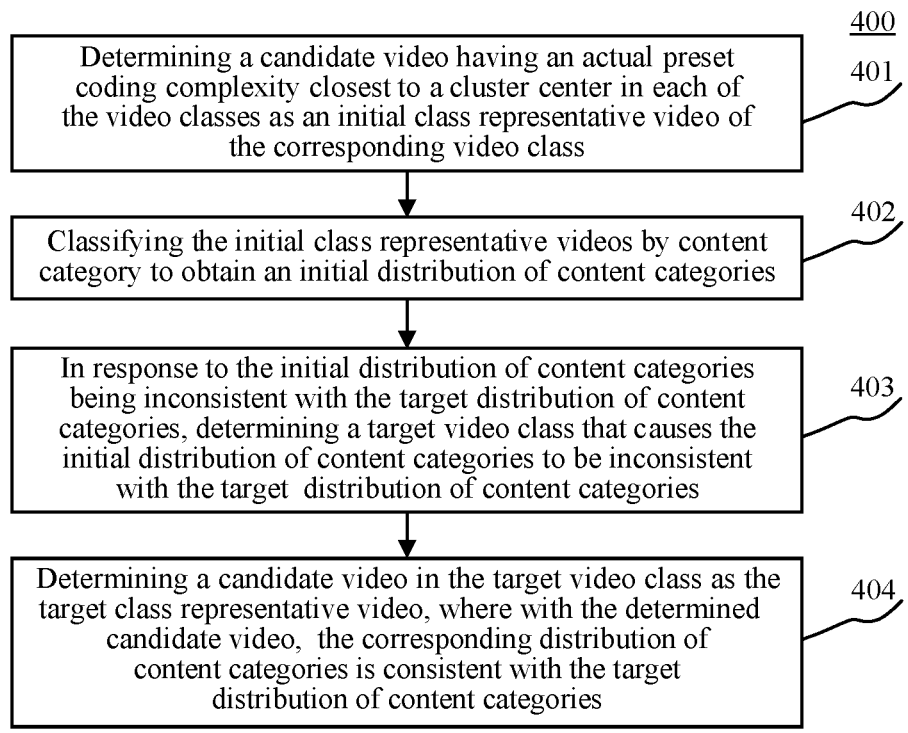
FIG. 4 is a flowchart of a method for determining a target class-representative video in the method for determining a video coding test sequence according to an embodiment of the present disclosure.

Referring to FIG. 4, FIG. 4 is a flowchart of a method for determining a target class-representative video in the method for determining a video coding test sequence according to an embodiment of the present disclosure. That is, a specific implementation is provided for step 204 in the flow 200 shown in FIG. 2, other steps in the flow 200 are not adjusted, and a new complete embodiment is obtained by replacing step 204 with the specific implementation provided in the present embodiment, where a flow 400 includes the following steps.

Step 401 includes: determining a candidate video having an actual preset coding complexity closest to a cluster center in each of the video classes as an initial class representative video of the corresponding video class;

In order to make the selected video most representative of each of the video classes, this step determines the candidate video having the actual comprehensive codes closest to the cluster center as the initial class representative video of the corresponding video class.

It can be seen that the cluster center is actually a preset coding complexity with a specific value. There are many approaches to calculate the value of the cluster center, such as calculating a mean, or other calculation approaches that can be used to obtain the class center. Therefore, by calculating a numerical difference or distance between the actual preset coding complexity of the candidate video in each of the video classes and the cluster center, the candidate video closest to the cluster center may be determined. Then, according to the principle that the closer to the cluster center is, the more representative of the video class is, the candidate video is determined as the initial class representative video of the corresponding video class.

Step 402 includes: classifying the initial class representative videos by content categories to obtain an initial distribution of content categories.

On the basis of step 401, the purpose of this step is to classify by the executing body the initial class representative videos by content categories to obtain the initial distribution of content categories, by referring to the classification operation of step 202.

Step 403 includes: in response to the initial distribution of content categories being inconsistent with the target distribution of content categories, determining a target video class causing the initial distribution of content categories to be inconsistent with the target distribution of content categories.

In this step, in view of the inconsistency between the initial distribution of content categories and the target distribution of content categories, the purpose of this step is to determine by the execution body the target video class that causes the inconsistency between the initial distribution of content categories and the target distribution of content categories.

It needs to be clear that in the case of the inconsistency, there should be more than one target video class, and there are at least two video classes at the same time, that is, one video class has an excess number and the other video class has an insufficient number. In this regard, the target video classes may also be subdivided into: a first target video class with an excess number and a second target video class with a insufficient number.

Step 404 includes: determining a candidate video in the target video class whose corresponding distribution of content categories is consistent with the target distribution of content categories as the target class-representative video.

On the basis of step 403, the purpose of this step is to determine by the executing body the candidate video in the target video class whose corresponding distribution of content categories is consistent with the target distribution of content categories as the target class-representative video. That is, by re-selecting a new class representative video, the actual distribution of content categories is made consistent with the target distribution of content categories.

Specifically, there are many approaches to reselect or select the target class-representative video, including selecting at any time, successively selecting based on an ascending order of distances to the cluster center, and selecting from the first target video class a target class-representative video closer to a cluster center of the second target video class, etc.

On the basis of the above embodiment, the present embodiment provides a specific implementation for step 204 in the flow 200 through steps 401 to 404, by first selecting the candidate video closest to the cluster center from each of the video classes as the class representative video representing the video class as an initial operation, and when the distribution of content categories corresponding to the initial class representative video is inconsistent with the target distribution of content categories, re-selecting to make the initial class representative video consistent with the target distribution of content categories, and finally obtaining the target class-representative video.

Figure 5:
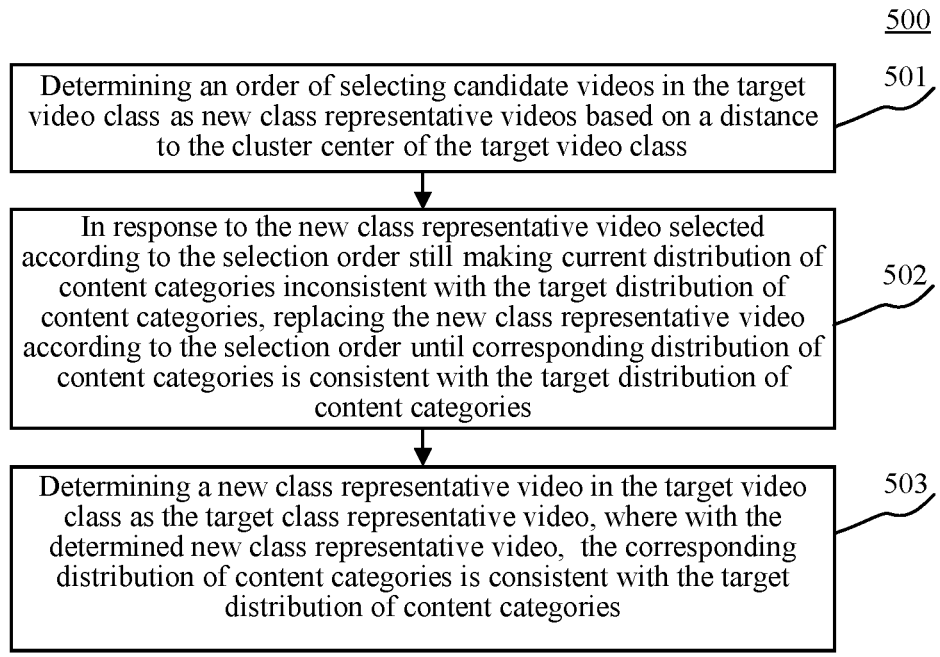
FIG. 5 is a flowchart of another method for determining a target class-representative video in the method for determining a video coding test sequence according to an embodiment of the present disclosure.

Referring to FIG. 5, FIG. 5 is a flowchart of another method for determining a target class-representative video in the method for determining a video coding test sequence according to an embodiment of the present disclosure. That is, a specific implementation is provided for step 404 in the flow 400 shown in FIG. 4, other steps in the flow 400 are not adjusted, and a new complete embodiment is obtained by replacing step 404 with the specific implementation provided in the present embodiment, where a flow 500 includes the following steps.

Step 501 includes: determining an order of selecting candidate videos in the target video class as new class representative videos, based on a distance to the cluster center of the target video class.

That is, the selection order should be expressed as the closer to the cluster center is, the earlier the selection is, the father from the cluster center is, the later the selection is. If the initial class representative video closest to the cluster center cannot make the actual distribution of content categories consistent with the target distribution of content categories, according to guidance provided in this step, in the re-selection, a candidate video second closest to the cluster center is used as a next class representative video to be re-verified.

Step 502 includes: in response to the new class representative video selected according to the selection order still making current distribution of content categories inconsistent with the target distribution of content categories, replacing the new class representative video according to the selection order until corresponding distribution of content categories is consistent with the target distribution of content categories.

This step is aimed at the situation that the current distribution of content categories is still inconsistent with the target distribution of content categories in the new class representative video selected according to the selection order, and the purpose of this step is to replace by the executing body the new class representative video according to the selection order until the corresponding distribution of content categories is consistent with the target distribution of content categories. That is, this step is repeatedly performed according to the selection order, until the current distribution of content categories can be made consistent with the target distribution of content categories.

Step 503 includes: determining a new class representative video in the target video class whose corresponding distribution of content categories is consistent with the target distribution of content categories as the target class-representative video.

That is, the present embodiment provides a specific implementation for the principle of trying successively in an ascending order of distances to the cluster center mentioned in step 404 in the flow 400, and the re-selection method in the present embodiment may ensure that each target class-representative video can represent the video class as much as possible.

Similarly, in order to reduce the number of attempts, the method for selecting from the first target video class a target class-representative video close to a cluster center of the second target video class may alternatively be used, so as to reduce time required to determine the target class-representative video in a tendentious, smaller number of attempts way.

In order to deepen understanding, the present disclosure also provides a specific implementation scheme in combination with an application scenario.

A target video coding test sequence to be constructed in the present embodiment includes two parts: a JCTVC sequence (that is, a general test video) and a service-specific sequence including service-specific test videos selected based on a service scenario, so that the target test sequence can not only cover basic video features included in the video standard, but also well reflect video features in the service scenario, so that the performance of a video coder finally tested can well match actual service videos.

A core technical point of this example is to select the most representative part of videos (dozens of class representative videos) from a huge candidate set of service videos (that is, including tens of thousands of candidate videos), in order to reduce the number of test sequences to improve test efficiency, as well as improve the relevance of test sequences to actual services.

A main implementation process includes:
1) determining that a ratio of the number of videos in the JCTVC sequence and the number of the service-specific sequence is N:M (for example, it may be set to 1:1), thereby determining the number of service-specific test videos to be X, and the total number of videos included in the target video coding test sequence to be constructed is Y;
2) analyzing video features of the tens of thousands of candidate videos corresponding to the actual service scenario, including an underlying feature, namely video comprehensive complexity and an upper-level feature, namely video content category, to determine distributions of the two features;

2-1) Calculating the Comprehensive Coding Complexity of Each of the Candidate Videos The comprehensive coding complexity reflects the comprehensive complexity of the candidate videos in the spatial and temporal domains, and may be calculated as follows:
① Use a specific coder (such as x264) to code all the candidate videos with the same coding mode to perform coding using multiple bit rates (such as cqp mode, in which the 4 bit rates are qp=22/27/32/37), record the bit rate and distortion of each bit rate, and normalize the bit rate by resolution and frame rate of the videos;
② Select a specific video as an anchor video (that is, the anchor video, which may also be understood as a basic video), and use all candidate service videos as test videos (test video, using the basic video as a calculation basis) to calculate BD-rate, the comprehensive coding complexity of the video is: Complexity=BD-rate+100. A value range of Complexity is (0, +∞). The larger the value is, the higher the complexity of the video is, and the smaller the value is, the lower the complexity of the video is.

It should be noted that when calculating BD-rate, it is needed to use a "complete coverage" mode, that is, the RD curve of the anchor and the RD curve of a test video are interpolated and extended until the two curves completely overlap in a distortion dimension;
③ After calculating the comprehensive complexities of the candidate videos, the candidate videos are arranged in an order of numerical values of the complexities, and are divided into X classes equally, where X is the number of service videos in the final test sequence obtained in 1).

2-2) Content Categories of the Candidate Videos
① According to the actual services, category labels may be determined. For example, all the candidate videos may be divided into N categories such as animation, movie, sports, game, music, education, others;
② Using artificial intelligence technology to analyze the video content of the candidate videos, the category of each video may be determined, the number of videos corresponding to each of the content categories may be counted, and the target distribution of content categories between different categories may be calculated based on the number of videos in the categories.

3) selecting the service-specific test videos based on a feature distribution of the candidate videos.
① According to the comprehensive coding complexity, a video at the cluster center of each class of complexity (that is, at a middle position of sorted videos of each class) is found, and a total of X videos is formed as an initial service-specific sequence;
② The target distribution of content categories between different categories is calculated based on the numbers of videos in the categories, the class representative videos in the service-specific sequence are adjusted, that is, a class representative video in the category whose number or proportion exceeds the number or proportion of this category in the target distribution of content categories is removed, and a new class representative video is re-selected from videos near the cluster center of the class to fill in the content category whose number or proportion is less than the number or proportion of this content category in the target distribution of content categories, until the actual distribution of content categories of the class representative videos included in the adjusted service-specific sequence is consistent with the target distribution of content categories.
③ The selected service-specific sequence is manually reviewed, videos having subjective anomalies (such as blurred focus, abnormal color, overexposure of brightness) are removed, and are replaced with subjectively non-abnormal videos of the same complexity and the same category of scenario.

For ease of understanding, here is an example:
1) When the number of JCTVC videos is 24 and N:M=1:1 is set, it can be seen that the number of videos in the service-specific sequence is also 24;
2) A distribution of content categories of tens of thousands of candidate videos corresponding to the service requirement is determined. Assuming that the videos are preset to be divided into 7 categories, the ratio of the numbers of videos in these 7 categories is 4:2:2:1:1:1:1. Therefore, when the total number is 24, the final selected number of videos of each category is 8, 4, 4, 2, 2, 2, 2;
3) the comprehensive coding complexity of all service-specific test videos may be calculated, and according to the values of the complexities and the designated number (i.e., 24) of cluster centers, video classes are obtained;
4) According to the cluster center of each video class, the candidate video closest to the cluster center is determined as the class representative video of the video class. It is assumed that the distribution of content categories corresponding to the 24 class representative videos is: 9:4:4:2:2:2:1, compared with 8:4:4:2:2:2:2 obtained from step 2), it can be seen that there is one excessive video in content category 1, and there is one video missing in content category 7;

5) a class representative video is re-selected from the target video class that is divided into content category 1 in the content category (still selected from videos near the cluster center) to try to see whether the distribution of content categories of the class representative videos obtained by the re-selection can be: 8:4:4:2:2:2:2.

6) Finally, the selected test sequence is corrected subjectively.

After completing the above steps, the target video coding test sequence may be used to test the coding performance of a to-be-tested coder corresponding to the target service requirement, to obtain a performance test result. Finally, an actual performance of the to-be-tested coder may be determined based on the performance test result.

Figure 6:
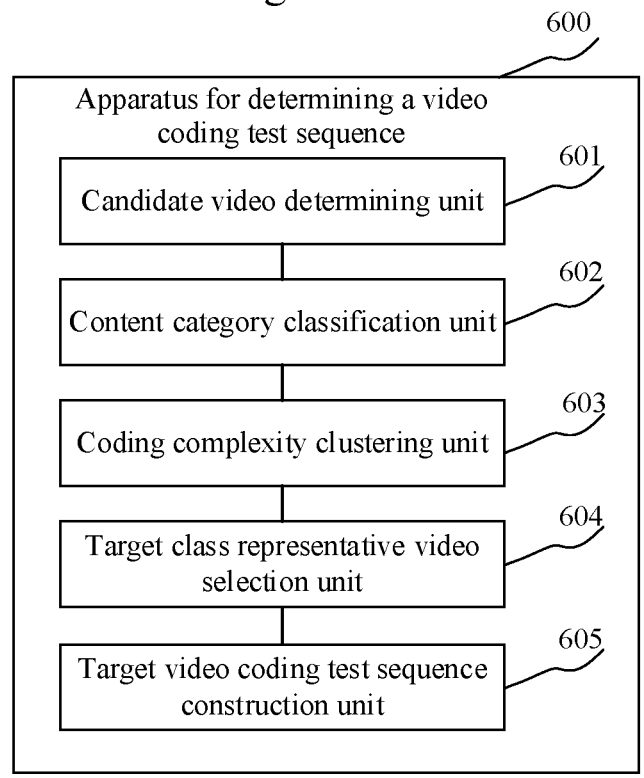
FIG. 6 is a structural block diagram of an apparatus for determining a video coding test sequence according to an embodiment of the present disclosure.

With further reference to FIG. 6, as an implementation of the method shown in the above figures, the present disclosure provides an embodiment of an apparatus for determining a video coding test sequence, which corresponds to the method embodiment shown in FIG. 2, and the apparatus may be specifically applied to various electronic devices.

As shown in FIG. 6, an apparatus 600 for determining a video coding test sequence of the present embodiment may include: a candidate video determining unit 601, a content category classification unit 602, a coding complexity clustering unit 603, a target class-representative video selection unit 604 and a target video coding test sequence construction unit 605. The candidate video determining unit 601 is configured to determine a candidate video set including multiple candidate videos corresponding to a target service requirement. The content category classification unit 602 is configured to classify the candidate videos by content categories to obtain a distribution of target content categories. The coding complexity clustering unit 603 is configured to cluster the candidate videos by values a preset coding complexity to obtain multiple video classes. The target class-representative video selection unit 604 is configured to select from each of the video classes respectively a target class-representative video such that an actual distribution of content categories is consistent with the target distribution of content categories. The target video coding test sequence construction unit 605 is configured to construct a target video coding test sequence, based on the target class-representative videos.

In the present embodiment, in the apparatus 600 for determining a video coding test sequence: for the specific processing and the technical effects of the candidate video determining unit 601, the content category classification unit 602, the coding complexity clustering unit 603, the target class-representative video selection unit 604 and the target video coding test sequence construction unit 605, reference may be made to the relevant descriptions of the steps 201-205 in the corresponding embodiment of FIG. 2 respectively, and detailed description thereof will be omitted.

In some alternative implementations of the present embodiment, the coding complexity clustering unit 603 may include:

a rate-distortion performance parameter calculation subunit, configured to calculate a BD-rate parameter of each of the candidate videos respectively based on a preset anchor video, to obtain a rate-distortion performance parameter of each of the candidate videos in a video coding process;

a service-specific test video number and cluster center number determination subunit, configured to acquire the number of service-specific test videos corresponding to the target service requirement, and use the number of service-specific test videos as the number of cluster centers; and a clustering subunit, configured to cluster the candidate videos according to values of the corresponding rate-distortion performance parameter, to obtain multiple video classes whose number is the number of the cluster centers.

In some alternative implementations of the present embodiment, the service-specific test video number and cluster center number determination subunit may include a service-specific test video number determination module configured to acquire the number of service-specific test videos corresponding to the target service requirement, and the service-specific test video number determination module may be further configured to:

determine the number of general test videos included in the target video coding test sequence; and determining the number of service-specific test videos corresponding to the target service requirement, based on the number of general test videos and a preset ratio.

In some alternative implementations of the present embodiment, the target class-representative video selection unit 604 may include:

an initial class representative video determination subunit, configured to determine a candidate video having an actual preset coding complexity closest to a cluster center in each of the video classes as an initial class representative video of the corresponding video class;

an initial content category distribution determination subunit, configured to classify the initial class representative videos by content categories to obtain an initial distribution of content categories;

a target video class determination subunit, configured to, in response to the initial distribution of content categories being inconsistent with the target distribution of content categories, determine a target video class that causes the initial distribution of content categories to be inconsistent with the target distribution of content categories; and a target class-representative video determination subunit, configured to determine, from the target video class, a candidate video with which the distribution of content categories is consistent with the target distribution of content categories, as the target class-representative video.

In some alternative implementations of the present embodiment, the target class-representative video determination subunit may be further configured to:

determine an order of selecting candidate videos in the target video class as new class representative videos, based on a distance to the cluster center of the target video class;

in response to the new class representative video selected according to the selection order still making a current distribution of content categories inconsistent with the target distribution of content categories, replace the new class representative video according to the selection order until the corresponding distribution of content categories is consistent with the target distribution of content categories; and determine a new class representative video in the target video class as the target class-representative video, where with the determined new class representative video, a corresponding distribution of content categories is consistent with the target distribution of content categories.

In some alternative implementations of the present embodiment, the apparatus 600 for determining a video coding test sequence may further include:

a performance test determination unit, configured to perform a coding performance test on a to-be-tested coder corresponding to the target service requirement using the target video coding test sequence, to obtain a performance test result; and a performance determination unit, configured to determine an actual performance of the to-be-tested coder based on the performance test result.

The present embodiment serves as an apparatus embodiment corresponding to the above method embodiment, on the basis of a general coding test sequence, the apparatus for determining a video coding test sequence provided by the present embodiment combines, for multiple candidate videos corresponding to the service requirement, the distribution in content categories and the clustering by the preset coding complexity. By controlling the actual distribution of content categories of the class representative video selected from each video class obtained by clustering, to be consistent with a true distribution of content categories of the candidate videos, the target class-representative video that reflects the service requirement in terms of content category and coding complexity is obtained, and finally the target video coding test sequence added with the additional target video representative videos is obtained. By using the target video coding test sequence, the apparatus can improve the evaluation pertinence and accuracy on coding performance of a to-be-tested coder for service-specific videos.

According to an embodiment of the present disclosure, the present disclosure also provides an electronic device, the electronic device including: at least one processor; and a memory communicatively connected to the at least one processor; where, the memory stores instructions executable by the at least one processor, and the instructions, when executed by the at least one processor, cause the at least one processor to implement the method for determining a video coding test sequence described in any of the above embodiments.

According to an embodiment of the present disclosure, the present disclosure also provides a computer readable storage medium storing computer instructions, where, the computer instructions are used to cause the computer to implement the method for determining a video coding test sequence described in any of the above embodiments.

According to an embodiment of the present disclosure, the present disclosure also provides a computer program product, including a computer program, where the computer program, when executed by a processor, implements the method for determining a video coding test sequence described in any of the above embodiments.

Figure 7:
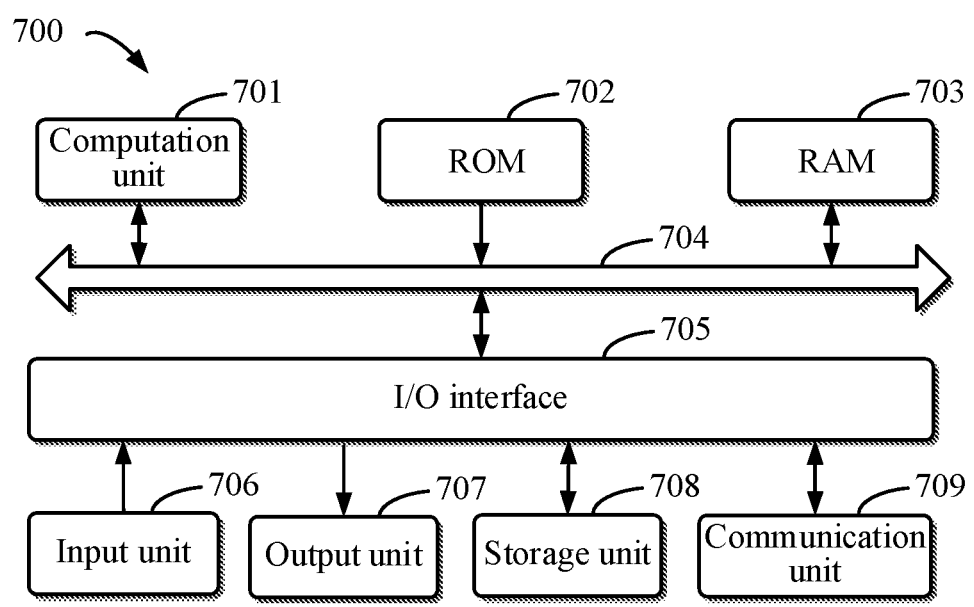
FIG. 7 is a schematic structural diagram of an electronic device adapted for performing the method for determining a video coding test sequence according to an embodiment of the present disclosure.

FIG. 7 illustrates a schematic block diagram of an example electronic device 700 that may be adapted to implement embodiments of the present disclosure. The electronic device is intended to represent various forms of digital computers, such as laptop computers, desktop computers, workbenches, personal digital assistants, servers, blade servers, mainframe computers, and other suitable computers. The electronic device may also represent various forms of mobile apparatuses, such as personal digital processors, cellular phones, smart phones, wearable devices, and other similar computing apparatuses. The components shown herein, their connections and relationships, and their functions are merely examples, and are not intended to limit the implementation of the present disclosure described and/or claimed herein.

As shown in FIG. 7, the device 700 includes a computation unit 701, which may perform various appropriate actions and processing, based on a computer program stored in a read-only memory (ROM) 702 or a computer program loaded from a storage unit 708 into a random access memory (RAM) 703. In the RAM 703, various programs and data required for the operation of the device 700 may also be stored. The computation unit 701, the ROM 702, and the RAM 703 are connected to each other through a bus 704. An input/output (I/O) interface 705 is also connected to the bus 704.

A plurality of parts in the device 700 are connected to the I/O interface 705, including: an input unit 706, for example, a keyboard and a mouse; an output unit 707, for example, various types of displays and speakers; the storage unit 708, for example, a disk and an optical disk; and a communication unit 709, for example, a network card, a modem, or a wireless communication transceiver. The communication unit 709 allows the device 700 to exchange information/data with other devices over a computer network such as the Internet and/or various telecommunication networks.

The computation unit 701 may be various general-purpose and/or dedicated processing components having processing and computing capabilities. Some examples of the computation unit 701 include, but are not limited to, central processing unit (CPU), graphics processing unit (GPU), various dedicated artificial intelligence (AI) computing chips, various computation units running machine learning model algorithms, digital signal processors (DSP), and any appropriate processors, controllers, microcontrollers, etc. The computation unit 701 performs the various methods and processes described above, such as a method for determining a video coding test sequence. For example, in some embodiments, the method for determining a video coding test sequence may be implemented as a computer software program, which is tangibly included in a machine readable medium, such as the storage unit 708. In some embodiments, part or all of the computer program may be loaded and/or installed on the device 700 via the ROM 702 and/or the communication unit 709. When the computer program is loaded into the RAM 703 and executed by the computation unit 701, one or more steps of the method for determining a video coding test sequence described above may be performed. Alternatively, in other embodiments, the computation unit 701 may be configured to perform the method for determining a video coding test sequence by any other appropriate means (for example, by means of firmware).

Various embodiments of the systems and techniques described above herein may be implemented in a digital electronic circuit system, an integrated circuit system, a field programmable gate array (FPGA), an application specific integrated circuit (ASIC), an application specific standard product (ASSP), a system on chip (SOC), a load programmable logic device (CPLD), computer hardware, firmware, software, and/or a combination thereof. These various embodiments may include: being implemented in one or more computer programs, the one or more computer programs may be executed and/or interpreted on a programmable system including at least one programmable processor, the programmable processor may be a special-purpose or general-purpose programmable processor, and may receive data and instructions from a storage system, at least one input device, and at least one output device, and transmitting data and instructions to the storage system, the at least one input device, and the at least one output device.

The program code for implementing the methods of the present disclosure may be written in any combination of one or more programming languages. These program codes can be provided to the processor or controller of a general-purpose computer, a special-purpose computer or other programmable data processing device, so that the program code, when executed by the processor or controller, enables the functions/operations specified in the flowchart and/or block diagram to be implemented. The program code can be fully executed on the machine, partially executed on the machine, partially executed on the machine and partially executed on the remote machine as a separate software package, or completely executed on the remote machine or server.

In the context of the present disclosure, a machine-readable medium may be a tangible medium that may contain or store a program for use by or in combination with an instruction execution system, apparatus, or device. The machine-readable medium may be a machine-readable signal medium or a machine-readable storage medium. Machine readable media may include, but is not limited to, electronic, magnetic, optical, electromagnetic, infrared, or semiconductor system, apparatus, or device, or any suitable combination of the foregoing. More specific examples of machine-readable storage media may include electrical connections based on one or more lines, portable computer disks, hard disks, random access memory (RAM), read only memory (ROM), erasable programmable read only memory (EPROM or flash memory), optical fibers, compact disk read only memory (CD-ROM), optical storage devices, magnetic storage devices, or any suitable combination of the above.

In order to provide interaction with the user, the systems and techniques described herein may be implemented on a computer having: a display device (e.g., a CRT (cathode ray tube) or LCD (liquid crystal display) monitor) for displaying information to the user; and a keyboard and a pointing device (e.g., a mouse or trackball) through which a user can provide input to a computer. Other kinds of devices can also be used to provide interaction with users. For example, the feedback provided to the user may be any form of sensor feedback (e.g., visual feedback, auditory feedback, or tactile feedback); and the input from the user can be received in any form (including acoustic input, voice input or tactile input).

The systems and techniques described herein may be implemented in a computing system including a background component (e.g., as a data server), or a computing system including a middleware component (e.g., an application server) or a computing system including a front-end component (e.g., a user computer with a graphical user interface or a web browser through which a user can interact with embodiments of the systems and techniques described herein), or a computing system including such a back-end component, a middleware component, or any combination of front-end components. The components of the system may be interconnected by digital data communication (e.g., a communication network) in any form or medium. Examples of communication networks include local area networks (LANs), wide area networks (WANs), and the Internet.

The computer system may include a client and a server. The client and server are generally far away from each other and usually interact through a communication network. A client server relationship is generated by computer programs running on the corresponding computers and having a client-server relationship. The server can be a cloud server, also known as a could computing server, or a cloud host, which is a host product in the cloud computing service system to solve the defects of difficult management and weak service scalability in services of the traditional physical host and virtual private server (VPS).

On the basis of a general coding test sequence, the technical solution provided by the embodiments of the present disclosure combines, for multiple candidate videos corresponding to the service requirement, the distribution in content categories and the clustering by the preset coding complexity. By controlling the actual distribution of content categories of the class representative video selected from each video class obtained by clustering to be consistent with a true distribution of content categories of the candidate videos, the target class-representative video that reflects the service requirement in terms of content category and coding complexity is obtained, and finally the target video coding test sequence added with the additional target video representative videos is obtained. By using the target video coding test sequence, the solution can improve the evaluation pertinence and accuracy on coding performance of a to-be-tested coder for service-specific videos.

It should be understood that steps can be reordered, added, or deleted using the various forms of processes shown above. For example, the steps described in the present disclosure can be performed in parallel, in sequence, or in different orders. As long as the desired results of the technical solution of the present disclosure can be achieved, which is not limited here.

The above specific embodiments do not constitute restrictions on the scope of the present disclosure. Those skilled in the art should understand that various modifications, combinations, sub combinations and substitutions can be made according to design requirements and other factors. Any modification, equivalent replacement and improvement made within the spirit and principles of this disclosure shall be included in the scope of protection of this disclosure.

What is claimed is:

1. A method for determining a video coding test sequence, the method comprising:
    determining a candidate video set including multiple candidate videos corresponding to a target service requirement;
    classifying the candidate videos by content categories to obtain a target distribution of content categories;
    clustering the candidate videos by values of a preset coding complexity to obtain multiple video classes;
    selecting from each of the video classes respectively a target class-representative video such that an actual distribution of content categories is consistent with the target distribution of content categories, comprising
    determining a candidate video having an actual preset coding complexity closest to the cluster center in each of the video classes as an initial class representative video of the corresponding video class,
    classifying the initial class representative videos by content categories to obtain an initial distribution of content categories,
    in response to the initial distribution of content categories being inconsistent with the target distribution of content categories, determining a target video class causing the initial distribution of content categories to be inconsistent with the target distribution of content categories,
    determining a candidate video in the target video class as the target class-representative video, wherein with the determined candidate video in the target video class, a corresponding distribution of content categories is consistent with the target distribution of content categories, comprising determining an order of selecting candidate videos in the target video class as new class representative videos based on a distance to the cluster center of the target video class, in response to the new class representative video selected according to the selection order still making a current distribution of content categories inconsistent with the target distribution of content categories, replacing the new class representative video according to the selection order until the corresponding distribution of content categories is consistent with the target distribution of content categories, determining the new class representative video in the target video class as the target class-representative video, wherein with the new class representative video, the corresponding distribution of content categories is consistent with the target distribution of content categories; and constructing a target video coding test sequence based on the target class-representative videos.

2. The method according to claim 1, wherein clustering the candidate videos by values of the preset coding complexity to obtain multiple video classes comprises:

calculating a Bjontegaard-Delta-rate (BD-rate) parameter of each of the candidate videos respectively based on a preset anchor video, to obtain a rate-distortion performance parameter of each of the candidate videos in a video coding process;

acquiring a number of service-specific test videos corresponding to the target service requirement, and using the number of service-specific test videos as a number of cluster centers; and clustering the candidate videos according to values of the corresponding rate-distortion performance parameter, to obtain the multiple video classes, a number of the multiple video classes being the number of the cluster centers.

3. The method according to claim 2, wherein acquiring the number of service-specific test videos corresponding to the target service requirement comprises:

determining a number of general test videos included in the target video coding test sequence; and determining the number of service-specific test videos corresponding to the target service requirement based on the number of general test videos and a preset ratio.

4. The method according to claim 1, further comprising:

performing a coding performance test on a to-be-tested coder corresponding to the target service requirement using the target video coding test sequence, to obtain a performance test result; and determining an actual performance of the to-be-tested coder based on the performance test result.

5. The method according to claim 1, comprising:

wherein the target distribution of content categories reflects a ratio between actual numbers of the candidate videos in each of the different content categories; and wherein the actual distribution of content categories of the selected representative videos of the video classes is controlled to be consistent with the target distribution of content categories.

6. The method according to claim 5, wherein the target distribution of content categories reflects a ratio between actual numbers of the candidate videos in each of the different content categories is an unequal ratio.

7. An electronic device, comprising:

at least one processor; and a memory communicatively connected to the at least one processor; wherein the memory stores instructions executable by the at least one processor, and the instructions, when executed by the at least one processor, cause the at least one processor to perform operations comprising:

determining a candidate video set including multiple candidate videos corresponding to a target service requirement;

classifying the candidate videos by content categories to obtain a target distribution of content categories;

clustering the candidate videos by values of a preset coding complexity to obtain multiple video classes;

selecting from each of the video classes respectively a target class-representative video such that an actual distribution of content categories is consistent with the target distribution of content categories, comprising determining a candidate video having an actual preset coding complexity closest to the cluster center in each of the video classes as an initial class representative video of the corresponding video class, classifying the initial class representative videos by content categories to obtain an initial distribution of content categories, in response to the initial distribution of content categories being inconsistent with the target distribution of content categories, determining a target video class causing the initial distribution of content categories to be inconsistent with the target distribution of content categories, determining a candidate video in the target video class as the target class-representative video, wherein with the determined candidate video in the target video class, a corresponding distribution of content categories is consistent with the target distribution of content categories, comprising determining an order of selecting candidate videos in the target video class as new class representative videos based on a distance to the cluster center of the target video class, in response to the new class representative video selected according to the selection order still making a current distribution of content categories inconsistent with the target distribution of content categories, replacing the new class representative video according to the selection order until the corresponding distribution of content categories is consistent with the target distribution of content categories, determining the new class representative video in the target video class as the target class-representative video, wherein with the new class representative video, the corresponding distribution of content categories is consistent with the target distribution of content categories; and constructing a target video coding test sequence based on the target class-representative videos.

8. The device according to claim 7, wherein clustering the candidate videos by values of the preset coding complexity to obtain multiple video classes comprises:

calculating a Bjontegaard-Delta-rate (BD-rate) parameter of each of the candidate videos respectively based on a preset anchor video, to obtain a rate-distortion performance parameter of each of the candidate videos in a video coding process;

acquiring a number of service-specific test videos corresponding to the target service requirement, and using the number of service-specific test videos as a number of cluster centers; and clustering the candidate videos according to values of the corresponding rate-distortion performance parameter, to obtain the multiple video classes, a number of the multiple video classes being the number of the cluster centers.

9. The device according to claim 8, wherein acquiring the number of service-specific test videos corresponding to the target service requirement comprises:

determining a number of general test videos included in the target video coding test sequence; and determining the number of service-specific test videos corresponding to the target service requirement based on the number of general test videos and a preset ratio.

10. The device according to claim 7, further comprising:

performing a coding performance test on a to-be-tested coder corresponding to the target service requirement using the target video coding test sequence, to obtain a performance test result; and determining an actual performance of the to-be-tested coder based on the performance test result.

11. The electronic device according to claim 7, comprising:

wherein the target distribution of content categories reflects a ratio between actual numbers of the candidate videos in each of the different content categories; and wherein the actual distribution of content categories of the selected representative videos of the video classes is controlled to be consistent with the target distribution of content categories.

12. The electronic device according to claim 11 wherein the target distribution of content categories reflects a ratio between actual numbers of the candidate videos in each of the different content categories is an unequal ratio.

13. A non-transitory computer readable storage medium storing computer instructions, wherein the computer instructions when executed by a computer cause the computer to perform operations comprising:

determining a candidate video set including multiple candidate videos corresponding to a target service requirement;

classifying the candidate videos by content categories to obtain a target distribution of content categories;

clustering the candidate videos by values of a preset coding complexity to obtain multiple video classes;

selecting from each of the video classes respectively a target class-representative video such that an actual distribution of content categories is consistent with the target distribution of content categories, comprising determining a candidate video having an actual preset coding complexity closest to the cluster center in each of the video classes as an initial class representative video of the corresponding video class, classifying the initial class representative videos by content categories to obtain an initial distribution of content categories, in response to the initial distribution of content categories being inconsistent with the target distribution of content categories, determining a target video class causing the initial distribution of content categories to be inconsistent with the target distribution of content categories, determining a candidate video in the target video class as the target class-representative video, wherein with the determined candidate video in the target video class, a corresponding distribution of content categories is consistent with the target distribution of content categories, comprising determining an order of selecting candidate videos in the target video class as new class representative videos based on a distance to the cluster center of the target video class, in response to the new class representative video selected according to the selection order still making a current distribution of content categories inconsistent with the target distribution of content categories, replacing the new class representative video according to the selection order until the corresponding distribution of content categories is consistent with the target distribution of content categories, determining the new class representative video in the target video class as the target class-representative video, wherein with the new class representative video, the corresponding distribution of content categories is consistent with the target distribution of content categories; and constructing a target video coding test sequence based on the target class-representative videos.

14. The storage medium according to claim 13, wherein clustering the candidate videos by values of the preset coding complexity to obtain multiple video classes comprises:

calculating a Bjontegaard-Delta-rate (BD-rate) parameter of each of the candidate videos respectively based on a preset anchor video, to obtain a rate-distortion performance parameter of each of the candidate videos in a video coding process;

acquiring a number of service-specific test videos corresponding to the target service requirement, and using the number of service-specific test videos as a number of cluster centers; and clustering the candidate videos according to values of the corresponding rate-distortion performance parameter, to obtain the multiple video classes, a number of the multiple video classes being the number of the cluster centers.

15. The storage medium according to claim 14, wherein acquiring the number of service-specific test videos corresponding to the target service requirement comprises:

determining a number of general test videos included in the target video coding test sequence; and determining the number of service-specific test videos corresponding to the target service requirement based on the number of general test videos and a preset ratio.

16. The storage medium according to claim 13, further comprising:

performing a coding performance test on a to-be-tested coder corresponding to the target service requirement using the target video coding test sequence, to obtain a performance test result; and determining an actual performance of the to-be-tested coder based on the performance test result.

17. The non-transitory computer readable storage medium storing computer instructions according to claim 13, comprising:

wherein the target distribution of content categories reflects a ratio between actual numbers of the candidate videos in each of the different content categories; and wherein the actual distribution of content categories of the selected representative videos of the video classes is controlled to be consistent with the target distribution of content categories.

18. The non-transitory computer readable storage medium storing computer instructions according to claim 17, wherein the target distribution of content categories reflects a ratio between actual numbers of the candidate videos in each of the different content categories is an unequal ratio.

* * * * *